(12) United States Patent
Seeger et al.

(10) Patent No.: US 7,449,239 B2
(45) Date of Patent: Nov. 11, 2008

(54) COATED METALLIC LUSTER PIGMENTS FOR PIGMENTING HIGH MOLECULAR WEIGHT MATERIALS

(75) Inventors: Oliver Seeger, Mannheim (DE); Norbert Mronga, Dossenheim (DE); Gunter Etzrodt, Stuttgart (DE); Arno Bohm, Mannheim (DE)

(73) Assignee: BASF Aktiengesellschaft, Ludwigshafen (DE)

( * ) Notice: Subject to any disclaimer, the term of this patent is extended or adjusted under 35 U.S.C. 154(b) by 35 days.

(21) Appl. No.: 10/551,434

(22) PCT Filed: Apr. 14, 2004

(86) PCT No.: PCT/EP2004/003948

§ 371 (c)(1), (2), (4) Date: Sep. 29, 2005

(87) PCT Pub. No.: WO2004/092261

PCT Pub. Date: Oct. 28, 2004

(65) Prior Publication Data

US 2007/0026224 A1    Feb. 1, 2007

(30) Foreign Application Priority Data

Apr. 16, 2003    (DE) ................ 103 17 862

(51) Int. Cl.
*B32B 5/16* (2006.01)
(52) U.S. Cl. .................. 428/404; 106/287.34; 106/404; 106/481
(58) Field of Classification Search ................ 428/403, 428/404; 106/404, 481, 287.34
See application file for complete search history.

(56) References Cited

U.S. PATENT DOCUMENTS

| | | | |
|---|---|---|---|
| 5,607,504 A | | 3/1997 | Schmid et al. |
| 5,763,086 A | * | 6/1998 | Schmid et al. ............. 428/404 |
| 6,013,370 A | | 1/2000 | Coulter et al. |
| 6,287,695 B1 | * | 9/2001 | Kaupp et al. ............... 428/403 |

| | | |
|---|---|---|
| 2003/0129404 A1 | 7/2003 | Argoitia et al. |

FOREIGN PATENT DOCUMENTS

| | | |
|---|---|---|
| DE | 40 30 727 | 4/1992 |
| DE | 195 16 181 | 11/1996 |
| DE | 198 20 112 | 11/1999 |
| DE | 101 28 489 | 12/2002 |
| EP | 0 259 592 | 3/1988 |
| EP | 0 668 329 | 8/1995 |
| EP | 0 708 154 | 4/1996 |
| JP | 1987/96565 | 5/1987 |
| JP | 1987/96566 | 5/1987 |
| WO | 99/35194 | 7/1999 |
| WO | WO 01/81483 | 11/2001 |
| WO | WO 2004/026268 | 4/2004 |
| WO | WO 2004/035684 | 4/2004 |

OTHER PUBLICATIONS

A. Kiehl et al, "Encapsulated aluminium pigments", *Progress in Organic Coatings*, 1999, pp. 179-183.
A. Kiehl et al, "Corrosion Inhibited Metal Pigments", *Macromol. Syrup 187*, 2002, pp. 109-120.
R. Schmid et al, "Luster Pigments with optically Variable Properties", *Creative Advances in Coatings Technology*, 4th Nürnberg Congress, Apr. 7-9, 1997, Pager 10, pp. 1-10.
A. Kiehl et al, "Encapsulated aluminium pigments", *Progress in Organic Coatings*, 1999, pp. 179-183.*
A. Kiehl et al, "Corrosion Inhibited Metal Pigments", *Macromol. Syrup 187*, 2002, pp. 109-120.*
R. Schmid et al, "Luster Pigments with optically Variable Properties", *Creative Advances in Coatings Technology*, 4th Nümberg Congress, Apr. 7-9, 1997, Pager 10, pp. 1-10.*
Eckart GmbH & Co., KG Brochure, "STAPA Aluminium Pastes", pp. 1-28, Feb. 2001.*
Eckart GmbH & Co., KG Brochure, "Metal effect pigments", pp. 1-16, Mar. 2001.*
Eckart GmbH & Co., KG Brochure, "Effect Pigments and Concentrates for plastics", pp. 1-29, Oct. 2001.*

* cited by examiner

*Primary Examiner*—H. T Le
(74) *Attorney, Agent, or Firm*—Oblon, Spivak, McClelland, Maier & Neustadt, P.C.

(57) ABSTRACT

Use of luster pigments based on a platelet-shaped metallic substrate coated with a low refractive dielectric layer which does not absorb visible light, for pigmenting macromolecular materials.

5 Claims, No Drawings

COATED METALLIC LUSTER PIGMENTS FOR PIGMENTING HIGH MOLECULAR WEIGHT MATERIALS

The present invention relates to the use of luster pigments based on a platelet-shaped metallic substrate coated with a low refractive dielectric layer which does not absorb visible light, for pigmenting macromolecular materials.

The present invention also relates to macromolecular materials pigmented with these luster pigments.

Luster or effect pigments are widely used in industry, for example in automotive coatings, decorative coatings, plastics coloration, painting and printing colors and also cosmetics.

Their optical effect is based on the directed reflection of light at predominantly sheetlike, mutually parallel-oriented, metallic or strongly refractive pigment particles. Lightness and hue too in some instances vary with the viewing angle.

Colorists distinguish two limiting cases: metallic effect luster and pearl luster.

In the case of metallic effect pigments, for example coated or uncoated aluminum platelets, it is specular reflection at the smooth surfaces of the platelets which dominates. Coatings or plastics colored with these pigments therefore exhibit an angle-dependent light-dark effect, also known as a lightness flop. Metallic effect pigments are characterized by metallic luster and high hiding power.

Pearl luster pigments, in contrast, are based on high refractive transparent platelets, for example mica flakes coated with titanium dioxide. Following parallelization of the platelets in the application medium, multiple reflection of light rays, which also pass through the pigment platelets, creates a silky, soft luster effect which appears to come from deep down and as is also characteristic for pearls.

In general, there is a wide range of application media to be colored for which there is particular interest in silver-colored metallic effect pigments having high reflection, especially high lightness near the gloss angle and hence a pronounced lightness flop.

Plastics in particular make additional high demands on the application properties of the pigments. Metallic effect pigments have to have high mechanical stability to be able to withstand the shearing forces of plastics processing without deforming or even disintegrating, which would result in reduced metallic luster and a mottled appearance and also, in the case of injection molding or blow molding, more distinct flow lines.

In addition, the effect pigments have to be efficiently alignable in the plastic, since an optimal metallic luster and a homogeneous appearance will only be obtained when ideally all pigment platelets have been oriented parallel to the surface. The parallelity is disrupted in the injection molding-process in particular, since various, nonuniform flow fronts will form in the mold in the course of the injection molding operation. When two flow fronts meet, the pigment platelets will be stood at this location and will then no longer be aligned parallel to the surface, and this in turn leads to a mottled appearance comprising clouds, flow lines and flow seams. What is more, the mechanical stability of the plastic will be reduced at the flow seams, since polymer melting is incomplete at flow line boundaries.

WO-A-99/35194 describes metallic effect pigments comprising a central reflective aluminum film from 40 to 150 nm and preferably 100 nm in thickness, which is coated on both sides with a silicon dioxide or magnesium fluoride film from 50 to 200 nm and preferably 100 nm in thickness. These pigments are produced in a very costly and inconvenient manner by alternately vaporing a substrate foil with the respective film materials in a high vacuum, removing the foil from the vapor-deposited multilayered film and comminuting the film to pigment particle size. This manufacturing process is such that the central metal film of these pigments is coated only at the platelet surface and subface.

The pigments disclosed in WO-A-99/35194 are said to exhibit high reflection and mechanical stability. True, the multilayered pigment particles have superior mechanical stability to pigment particles based on the uncoated aluminum film, but reflection (as would incidentally not come as a total surprise to one skilled in the art) is distinctly reduced by the coating on the metal film. The actual reduction in reflection exceeds the reduction calculated in WO-A-99/35194.

According to JP-A-1987/96565 and JP-A-1987/96566, plastics colorations having a high metallic luster are obtainable without flow lines by using coarse uncoated aluminum platelets having large platelet diameters and also, in particular, platelet thicknesses. True, these pigment platelets are mechanically stable, but lead to often unwanted sparkling because of their coarseness, exhibit only a minimal lightness flop and have less hiding power than more finely divided pigments.

It is an object of the present invention to provide silver-colored metallic effect pigments which have high lightness near the gloss angle and hence a pronounced lightness flop and also exhibit advantageous mechanical properties especially in relation to the coloration of plastics.

We have found that this object is achieved by the use of luster pigments based on a platelet-shaped metallic substrate coated with a low refractive dielectric layer which does not absorb visible light, for pigmenting macromolecular materials.

The present invention also provides macromolecular materials pigmented with these luster pigments.

The luster pigments to be used according to the present invention are based on metallic substrate platelets which have a colorless dielectric coating on all side surfaces. These coatings are low refractive in that they generally have a refractive index n of <1.8.

The dielectric layer is typically from 100 to 800 nm, preferably from 250 to 450 nm and more preferably from 300 to 400 nm in thickness.

Any metal platelet known for metallic effect pigments, for example aluminum and aluminum alloys, iron and steel, is useful as a substrate for the luster pigments to be used according to the present invention.

Preference is given to aluminum flakes which are producible in a simple manner by stamping out of aluminum foil or according to common atomizing and grinding techniques. Commercially available products may be used.

The size of the metallic substrate particles is in itself not critical and can be adjusted to the desired optical effect. In general, the metal platelets have median ($d_{50}$) diameters from about 5 to 200 μm, and especially from 10 to 50 μm and thicknesses from about 0.1 to 5 μm and especially from 0.1 to 0.3 μm. Their specific free surface area (BET) is generally in the range from 0.1 to 8 $m^2/g$.

The low refractive coating of the luster pigments to be used according to the present invention may be formed from any colorless material which can be durably applied to the substrate platelets as a film. The material should also satisfy the requirements on use, i.e., have the requisite fastnesses and also especially thermal stabilities. As examples of such a material there may be mentioned silicon dioxide, silicon oxide hydrate, aluminum oxide, aluminum oxide hydrate, magnesium fluoride and aluminum phosphate. Particular preference here is given to silicon dioxide, silicon oxide hydrate and mixtures thereof.

Luster pigments of this kind are known from EP-A-708 154 for example. They are advantageously prepared wet-chemically by hydrolytic decomposition of organic silicon compounds in which the organic radicals are attached to the silicon atom via oxygen atoms and especially of alkoxysilanes, in the presence of an organic solvent in which the silicon compounds are soluble, and subsequent drying.

They may also be prepared according to the chemical vapor deposition (CVD) process described in EP-A-668 329 by decomposing volatile silanes comprising at least one alkanoyloxy radical in the presence of water vapor and/or oxygen and of agitated metal platelets. However, wet-chemical coating is preferable.

If desired, the luster pigments to be used according to the invention may be provided with an additional colorless outside layer of a surface-modifying agent to enhance their compatibility with the macromolecular materials to be pigmented. Examples of useful surface-modifying agents are alkoxyalkylsilanes whose alkyl radicals are terminally functionalized.

Surprisingly, the luster pigments to be used according to the present invention exhibit in use a distinctly higher reflection than the uncoated aluminum pigments. Reflection in the visible region of the electromagnetic spectrum in polypropylene for example is generally up by about 30-40%. This corresponds to an increase in the lightness L* of about 10-15 points, measured 5° outside the gloss angle.

The luster pigments to be used according to the present invention are particularly light not just near the gloss angle and hence also particularly brilliant and, what is more, are notable for a pronounced lightness flop.

Moreover, they are outstandingly incorporable into plastics in that distinctly reduced flow line formation is observed.

The luster pigments to be used according to the present invention are useful for pigmenting organic and inorganic macromolecular materials. As examples of these materials there may be mentioned plastics, coatings for a wide variety of materials, including powder coatings, painting and printing colors, inks, glasses and inorganic/organic composites.

The luster pigments to be used according to the invention are particularly important for the pigmenting of plastics, meaning not only thermoplastics but also thermosets. Examples include: polyethylene (PE), polypropylene (PP), polyisobutene (PIB), polyvinyl chloride (PVC), polyvinylidene difluoride (PVDF), polycarbonate (PC), polycarbonate-polyester blends, polyethylene terephthalate (PET), polyethylene naphthenate (PEN), polybutylene terephthalate (PBT), polystyrene (PS), acrylate-butadiene-styrene (ABS) copolymers, styrene-acrylonitrile (SAN) copolymers, polymethyl (meth)acrylate (PM(M)A), polybutyl (meth)acrylate (PB(M)A), polyamides, such as N6, N6,6 and N12, polyethers, polyphenylene ethers, polyether sulfones, polyether ketones, polyphenylene sulfides, polyimides, polyetherimides, polyesterimides, polyoxymethylene and polyurethanes (PU, TPU). Also explicitly mentioned may be polymerizable casting resins based on styrene, acrylate or polyester, post-curable polycondensation resins based on melamine or epoxy and PVC and PU coating pastes which are used for textile coatings for example.

EXAMPLES

A) Preparation of Luster Pigments Used According to the Present Invention

Example 1A 50 kg of aluminum pigment paste ($d_{50}$ platelet diameter 17 µm, platelet thickness about 0.14 µm; Alpate® NS 7670 from Toyal Europe; solids content 65% by weight) were dispersed in a mixture of 480 kg of ethanol and 4.4 kg of tetraethoxysilane placed in a 1 m³ stirred vessel as an initial charge by stirring for 1.5 h. Following addition of initially 142 kg of water and then 14.3 kg of 25% by weight aqueous ammonia solution, the suspension was gradually heated to 60° C. Starting at 55° C., the simultaneous addition through separate metering means was commenced of (1) 3.6 kg/h of tetraethoxysilane, (2) 0.94 kg/h of ethanol and (3) 0.86 kg/h of 2.5% by weight aqueous ammonia solution.

After 306 kg of tetraethoxysilane had been added (coating time 85 h), the metered additions were stopped and the suspension was subsequently stirred for a further 5 h. After the suspension had been cooled to room temperature, the coated aluminum pigment was filtered off, washed first with ethanol and then with water and subsequently spread out on trays and dried at 100° C. in a drying cabinet.

This gave 118 kg of light silvery $SiO_2$-coated aluminum pigment ($SiO_2$ content 69% by weight, $SiO_2$ coating layer thickness 340 nm).

Example 2A

Example 1A was repeated except that the coating time was only 44 h, which corresponds to an addition of 158.5 kg of tetraethoxysilane.

This gave 79 kg of light silvery $SiO_2$-coated aluminum pigment ($SiO_2$ content 59% by weight, $SiO_2$ coating layer thickness 230 nm).

Example 3A

Example 1A was repeated except that the coating time was only 20 h, which corresponds to an addition of 72 kg of tetraethoxysilane.

This gave 54 kg of light silvery $SiO_2$-coated aluminum pigment ($SiO_2$ content 41% by weight, $SiO_2$ coating layer thickness 109 nm).

Example 4A

Example 1A was repeated except that the coating time was only 13 h, which corresponds to an addition of 46.8 kg of tetraethoxysilane.

This gave 47 kg of light silvery $SiO_2$-coated aluminum pigment ($SiO_2$ content 32% by weight, $SiO_2$ coating layer thickness 75 nm).

Example 5A

A suspension of 150 g of aluminum pigment paste ($d_{50}$ platelet diameter 15 µm, platelet thickness about 0.13 µm; Alpate F 795 from Toyal Europe; solids content 70% by weight) in 1.6 l of ethanol introduced as an initial charge in a four neck round glass flask was admixed with 16.4 ml of tetraethoxysilane, 450 ml of water and 40 g of 25% by weight aqueous ammonia solution added in succession with intensive stirring. After heating to 60° C., the separate metered addition commenced of (1) 40 ml/h of tetraethoxysilane, (2) 10 ml/h of 2.5% by weight aqueous ammonia solution and (3) 15 ml/h of ethanol with stirring and keeping the temperature constant at 60° C.

After 951 ml of tetraethoxysilane had been added (coating time 23.8 h) the metered additions were stopped and the suspension was subsequently stirred for 1 h. After cooling to room temperature, the coated aluminum pigment was filtered off, washed with ethanol and dried at 100° C. under reduced pressure.

This gave 364 g of light silvery $SiO_2$-coated aluminum pigment ($SiO_2$ content 71% by weight, $SiO_2$ coating layer thickness 389 nm).

Example 6A

Example 5A was repeated, except that a total 723 ml of tetraethoxysilane were used.

This gave 303 g of light silvery $SiO_2$-coated aluminum pigment ($SiO_2$ content 64% by weight, $SiO_2$ coating layer thickness 282 nm).

Example 7A

Example 5A was repeated, except that a total 334 ml of tetraethoxysilane were used.

This gave 190 g of light silvery $SiO_2$-coated aluminum pigment ($SiO_2$ content 46% by weight, $SiO_2$ coating layer thickness 135 nm).

Example 8A

Example 5A was repeated, except that a total 195 ml of tetraethoxysilane were used.

This gave 154 g of light silvery $SiO_2$-coated aluminum pigment ($SiO_2$ content 34% by weight, $SiO_2$ coating layer thickness 82 nm).

Example 9A

Example 5A was repeated, except that a total 119 ml of tetraethoxysilane were used.

This gave 133 g of light silvery $SiO_2$-coated aluminum pigment ($SiO_2$ content 22% by weight, $SiO_2$ coating layer thickness 50 nm).

Example 10A

A suspension of 350 g of aluminum pigment paste ($d_{50}$ platelet diameter 75 μm, platelet thickness about 0.5 μm; Stapa Metallux® 211 from Eckart-Werke; solids content 70% by weight) in 1.3 l of ethanol introduced as an initial charge in a three neck round glass flask was admixed with 14.2 ml of tetraethoxysilane, 400 ml of water and 40 g of 25% by weight aqueous ammonia solution added in succession with intensive stirring. After heating to 60° C., the separate metered addition commenced of (1) 25 ml/h of tetraethoxysilane, (2) 10 ml/h of 2.5% by weight aqueous ammonia solution and (3) 10 ml/h of ethanol with stirring and keeping the temperature constant at 60° C.

After 602 ml of tetraethoxysilane had been added (coating time 23.5 h) the metered additions were stopped and the suspension was subsequently stirred for 1 h. After cooling to room temperature, the coated aluminum pigment was filtered off, washed with ethanol and dried at 100° C. under reduced pressure.

This gave 415 g of light silvery $SiO_2$-coated aluminum pigment ($SiO_2$ content 39.1% by weight, $SiO_2$ coating layer thickness 335 nm).

Example 11A

Example 10 A was repeated, except that a total 664 ml of tetraethoxysilane were used.

This gave 432 g of light silvery $SiO_2$-coated aluminum pigment ($SiO_2$ content 41.9% by weight, $SiO_2$ coating layer thickness 383 nm).

B) Use of Luster Pigment Products for Pigmenting Plastics

The luster pigments produced in example 1A to 11A were used to pigment plastics plaques which were subsequently subjected to colorimetric measurement. The numbering of the use examples corresponds to the numbering of the preparation examples, but the use examples are identified by an added B. In other words, the luster pigment from preparation example 1A was used in use example 1B, etc.

Plastics plaques were also pigmented with the respective uncoated aluminum pigments, for comparison.

To determine their colorimetric data, the pigmented plastics plaques were measured according to measuring method I and II. The data obtained were converted into the CIE values L*, a* and b* for D65 standard illuminant and 10° standard observer.

Measuring Method I

The pigmented plastics plaques were subjected to an angle-dependent measurement using a Multiflash goniospectrophotometer from Optronic (Berlin, Germany). The illumination angle was held at a constant 45°, while the difference angle between the angle of measurement and the gloss angle was changed.

A white ceramic tile was used as a reference for measuring the lightness.

To characterize the lightness flop of the plaques on changing from plan view to inclined view, a metallic effect value ME was defined as follows:

$$ME = \frac{(L^*_{25} - L^*_{75})}{L^*_{75}}$$

where:

$L^*_{25}$ is the lightness of the plaque at 25° away from the gloss angle $L^*_{75}$ is the lightness of the plaque at 75° away from the gloss angle The larger the ME values, the bigger the lightness flop.

The results obtained with measuring method I are summarized in table 1, 3 and 5.

Measuring Method II

The pigmented plastics plaques were subjected to an angle-dependent measurement using a Zeiss GKR 311 goniospectrophotometer. The difference angle between angle of measurement and gloss angle was kept at a constant 5° while the illumination angle was changed in 5° increments.

The reference used was the plastics plaque which was pigmented with the respective uncoated aluminum pigment and which was assigned a lightness value of 100.

The results obtained with measuring method II are summarized in table 2, 4 and 6. The stated angles each relate to the horizontal on the sample.

Examples 1B to 4B

The SiO$_2$-coated aluminum pigments from examples 1A to 4A were each dispersed in a 20% by weight solution of polymethyl methacrylate (PMMA; Lucryle®, BASF) in acetone using a dissolver stirrer at 1400 rpm for 30 min. The suspension obtained in each case was injected into a fluidized bed to evaporate the acetone.

The granular PMMA obtained, comprising 5% by weight of pigment, was diluted to a pigment of concentration of 2% by weight by mixing with further PMMA and cast as a color layer in a continuous three-layer sheet (1.2 m in width).

The three-layer sheet had the following construction:
50 µm clear top layer (PMMA)
200 µm color layer (PMMA+pigment)
600 µm bottom layer ASA (acrylonitrile-styrene-acrylate copolymer; Luran® S, BASF)

The results obtained from the colorimetric measurement according to measuring method I and II are summarized in tables 1 and 2 respectively. Table 1 also recites, for comparison, the results obtained with the uncoated aluminum pigment from example 1A (example C1). The abbreviations in table 2 have the following meanings:
BW: illumination angle
MW: measuring angle

TABLE 1

| Example | L*$_{25}$ | L*$_{75}$ | ME |
|---|---|---|---|
| 1B | 81.4 | 30.7 | 1.65 |
| 2B | 94.2 | 29.7 | 2.17 |
| 3B | 93.4 | 28.9 | 2.23 |
| 4B | 79.8 | 27.5 | 1.91 |
| C1 | 74.1 | 40.2 | 0.84 |

TABLE 2

| BW [°] | MW [°] | L* (Ex. 1B) | L* (Ex. 2B) | L* (Ex. 3B) | L* (Ex. 4B) |
|---|---|---|---|---|---|
| 75 | 100 | 112.1 | 113.0 | 119.7 | 132.9 |
| 70 | 105 | 111.5 | 112.7 | 119.2 | 132.4 |
| 65 | 110 | 111.2 | 112.4 | 118.9 | 132.1 |
| 60 | 115 | 110.8 | 112.1 | 118.8 | 131.7 |
| 55 | 120 | 110.6 | 112.4 | 118.7 | 131.4 |
| 50 | 125 | 110.2 | 112.2 | 118.6 | 130.9 |
| 45 | 130 | 110.0 | 112.3 | 118.6 | 130.5 |
| 40 | 135 | 109.4 | 112.1 | 118.4 | 129.6 |
| 35 | 140 | 108.9 | 112.1 | 118.3 | 128.6 |
| 30 | 145 | 108.0 | 111.8 | 117.5 | 126.9 |
| 25 | 150 | 106.5 | 110.9 | 116.0 | 123.9 |

Examples 5B to 9B the SiO$_2$-coated aluminum pigments from examples 5A to 9A were each preextruded in crystal grade polypropylene (Metocene® X 50081, Basell) in a concentration of 1% by weight and injection molded to form a 6 cm×4.4 cm×0.2 cm plaque.

The results obtained from the colorimetric measurement according to measuring method I and II are summarized in tables 3 and 4 respectively. Table 3 also recites, for comparison, the results obtained with the uncoated aluminum pigment-from example 5A example C2). The abbreviations in table 4 have the following meanings:
BW: illumination angle
MW: measuring angle

TABLE 3

| Example | L*$_{25}$ | L*$_{75}$ | ME |
|---|---|---|---|
| 5B | 89.5 | 29.4 | 2.04 |
| 6B | 95.0 | 29.0 | 2.28 |
| 7B | 104.3 | 30.6 | 2.41 |
| 8B | 105.2 | 30.4 | 2.46 |
| 9B | 105.6 | 32.1 | 2.29 |
| C2 | 104.6 | 36.6 | 1.86 |

TABLE 4

| BW [°] | MW [°] | L* (Ex. 5B) | L* (Ex. 6B) | L* (Ex. 7B) | L* (Ex. 8B) | L* (Ex. 9B) |
|---|---|---|---|---|---|---|
| 75 | 100 | 107.1 | 110.9 | 113.3 | 116.7 | 112.0 |
| 70 | 105 | 106.7 | 110.9 | 112.6 | 115.6 | 111.5 |
| 65 | 110 | 107.0 | 111.0 | 112.5 | 115.4 | 111.3 |
| 60 | 115 | 106.8 | 110.8 | 112.0 | 114.9 | 110.7 |
| 55 | 120 | 106.4 | 110.6 | 111.5 | 114.3 | 110.1 |
| 50 | 125 | 106.5 | 110.3 | 111.3 | 114.0 | 109.9 |
| 45 | 130 | 106.8 | 110.1 | 111.3 | 114.0 | 109.7 |
| 40 | 135 | 106.4 | 109.0 | 110.6 | 113.2 | 109.0 |
| 35 | 140 | 105.8 | 108.2 | 109.5 | 112.1 | 108.0 |
| 30 | 145 | 104.9 | 106.2 | 107.6 | 110.0 | 106.3 |
| 25 | 150 | 103.5 | 104.0 | 105.4 | 107.7 | 103.1 |

Examples 10B and 11B

The SiO$_2$-coated aluminum pigments from examples 10A to 11A were each preextruded in crystal grade polypropylene (Metocene® X 50081, Basell) in a concentration of 2% by weight and injection molded to form a 6 cm×4.4 cm×0.2 cm plaque.

The results obtained from the colorimetric measurement according to measuring method I and II are summarized in tables 4 and 5 respectively. Table 5 also recites, for comparison, the results obtained with the uncoated aluminum pigment from example 10A (example C3). The abbreviations in table 6 have the following meanings:
BW: illumination angle
MW: measuring angle

TABLE 5

| Example | L*$_{25}$ | L*$_{75}$ | ME |
|---|---|---|---|
| 10B | 79.2 | 35.1 | 1.26 |
| 11B | 79.7 | 35.2 | 1.26 |
| C3 | 76.3 | 38.1 | 1.00 |

TABLE 6

| BW [°] | MW [°] | L* (Ex. 10B) | L* (Ex. 11B) |
|---|---|---|---|
| 75 | 100 | 113.3 | 115.5 |
| 70 | 105 | 113.2 | 115.5 |
| 65 | 110 | 113.0 | 115.4 |
| 60 | 115 | 113.1 | 115.2 |
| 55 | 120 | 113.0 | 115.2 |
| 50 | 125 | 112.0 | 114.1 |
| 45 | 130 | 110.7 | 112.9 |
| 40 | 135 | 110.1 | 112.1 |
| 35 | 140 | 106.1 | 108.0 |
| 30 | 145 | 102.9 | 105.0 |
| 25 | 150 | 100.4 | 103.7 |

We claim:

1. A silver-colored pigment for pigmenting macromolecular materials, comprising:
    a platelet-shaped aluminum substrate; and a coating provided on all sides of the aluminum substrate; wherein the coating consists of:
a low refractive dielectric layer that does not absorb visible light, the layer consisting essentially of at least one of silicon dioxide and silicon oxide hydrate and having a thickness of from 250 to 450 nm; and
an optional colorless outside layer comprising a surface-modifying agent that enhances compatibility of the pigment with the macromolecular materials.

2. The silver-colored pigment of claim 1, wherein said dielectric layer has a refractive index n<1.8.

3. The silver-colored pigment of claim 1, wherein said dielectric layer is from 300 to 400 nm in thickness.

4. The silver-colored pigment of claim 1, wherein the pigment is suitable for pigmenting macromolecular materials selected from the group consisting of plastics, coatings, painting and printing colors, inks, glasses and inorganic/organic composites.

5. A macromolecular pigmented material comprising the silver-colored pigment of claim 1.

* * * * *